us007236946B2

United States Patent
Bates et al.

(10) Patent No.: US 7,236,946 B2
(45) Date of Patent: Jun. 26, 2007

(54) OPERATION OF CONTROL SYSTEM FOR ENSURING AVAILABILITY OF PURCHASABLE ITEMS IN NETWORKED MACHINES

(75) Inventors: Cary Lee Bates, Rochester, MN (US);
Mahdad Majd, Rochester, MN (US);
John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 09/848,572

(22) Filed: May 3, 2001

(65) Prior Publication Data

US 2002/0165787 A1  Nov. 7, 2002

(51) Int. Cl.
*G06Q 30/00* (2006.01)
(52) U.S. Cl. .................................. 705/26
(58) Field of Classification Search .......... 705/26, 705/27, 14; 340/5.9, 5.91
See application file for complete search history.

(56) References Cited

U.S. PATENT DOCUMENTS

| | | | | |
|---|---|---|---|---|
| 5,091,713 A | 2/1992 | Horne et al. | ............ | 340/541 |
| 5,207,784 A | 5/1993 | Schwartzendrube | ............ | 221/6 |
| 5,769,269 A | 6/1998 | Peters | ............ | 221/7 |
| 5,930,771 A | 7/1999 | Stapp | ............ | 705/28 |
| 5,959,869 A | 9/1999 | Miller et al. | ............ | 364/479.01 |
| 6,021,390 A * | 2/2000 | Satoh et al. | ............ | 705/1 |
| 6,038,491 A | 3/2000 | McGarry et al. | ............ | 700/231 |
| 6,056,194 A | 5/2000 | Kolls | ............ | 235/381 |
| 6,085,888 A * | 7/2000 | Tedesco et al. | ............ | 194/217 |
| 6,286,710 B1 * | 9/2001 | Paek | ............ | 221/8 |
| 6,330,490 B1 * | 12/2001 | Kim et al. | ............ | 700/234 |
| 6,446,045 B1 * | 9/2002 | Stone et al. | ............ | 705/26 |
| 6,490,443 B1 * | 12/2002 | Freeny, Jr. | ............ | 455/406 |
| 6,594,646 B1 * | 7/2003 | Okayama et al. | ............ | 705/51 |
| 6,629,080 B1 * | 9/2003 | Kolls | ............ | 705/26 |
| 2002/0077724 A1 * | 6/2002 | Paulucci et al. | ............ | 700/231 |

FOREIGN PATENT DOCUMENTS

JP  411039547 A  *  2/1999

OTHER PUBLICATIONS http://www.instymeds.com/sun.html, "Sun Newspapers", Jun. 16, 2004.

* cited by examiner

*Primary Examiner*—Ronald Laneau
(74) *Attorney, Agent, or Firm*—Patterson & Sheridan, LLP

(57) ABSTRACT

Embodiments of the present invention provide for a method, system and article of manufacture for operating vending machines. In general, a plurality of vending machines are nodes of a network. Each node is configured to send, receive and process signals carrying inventory, pricing, reservation and/or refund information. In such embodiments, a vending machine is configured to receive a reservation request for a specified item. The request may be issued from one of a plurality of client devices (e.g., wireless telephones, desktop computers and the like) or from a reservation control system. In still another embodiment, vending machines may be configured to provide refunds under controlled conditions. A consumer may request a refund in cases where the consumer was improperly charged for goods are services that were not provided.

26 Claims, 14 Drawing Sheets

INVENTORY FILE — 314

| ITEM | PRICE | MAX PRICE | NUMBER AVAILABLE | ---- |
|------|-------|-----------|------------------|------|
|      |       | ⋮         |                  |      |
| "    | "     | "         | "                |      |

REPLY LIST FILE — 312

| ID | PRICE | LOCATION | DIRECTIONS | ---- |
|----|-------|----------|------------|------|
| "  | "     | "        | "          |      |
|    |       | ⋮        |            |      |
| "  | "     | "        | "          |      |

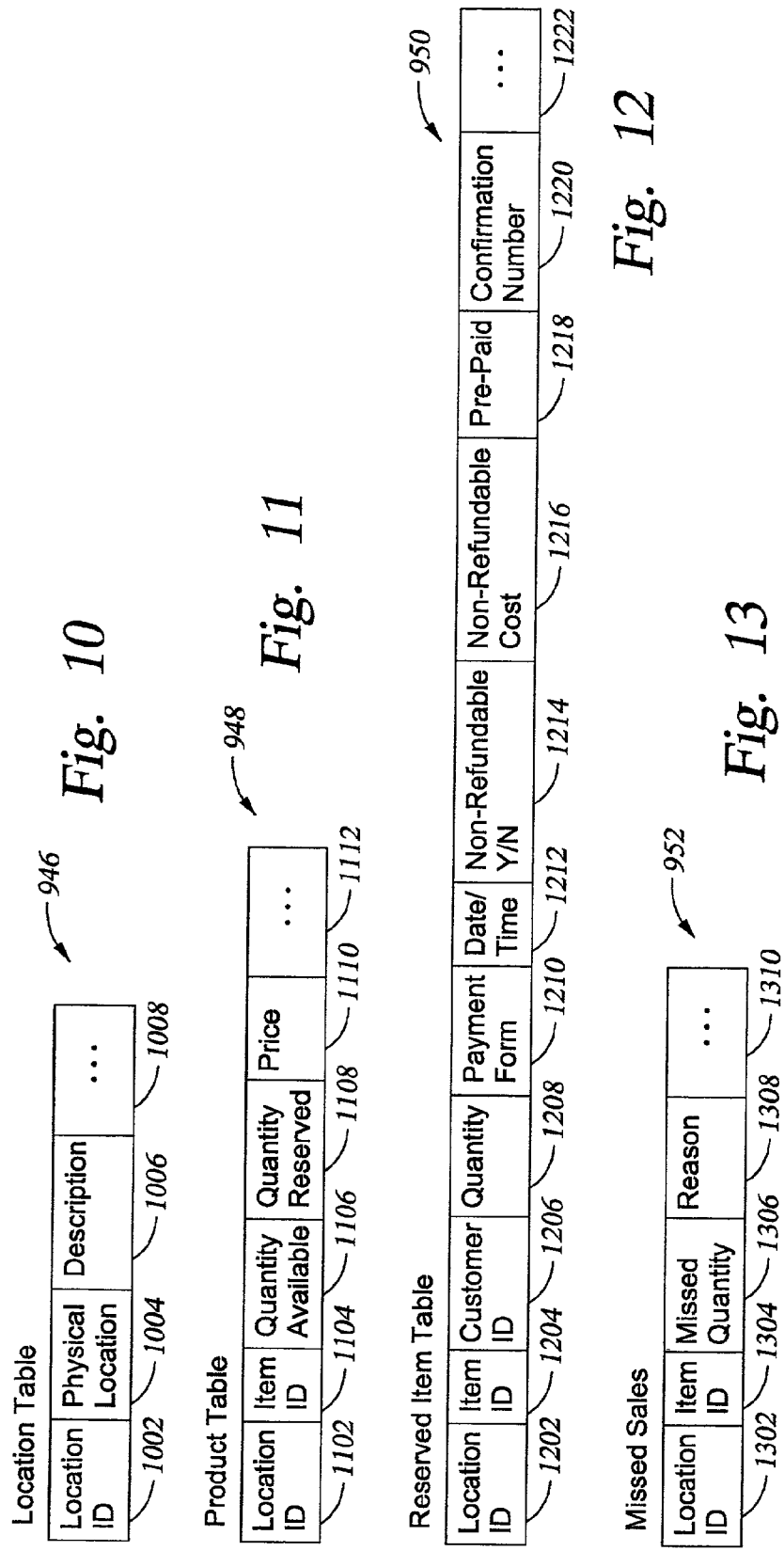

Free Money Table — 954

| Location ID | Item | Quantity | Price | ... |
|---|---|---|---|---|
| 1402 | 1404 | 1406 | 1408 | 1410 |

*Fig. 14*

Non-Refundable Cost Table — 955A

| Location ID | Item | Non-Refundable Cost | ... |
|---|---|---|---|
| 1502 | 1504 | 1506A | 1508 |

| Location ID | Item | Time 1/Cost 1 | Time 2/Cost 2 | ... | Time N/Cost N | ... |
|---|---|---|---|---|---|---|
| 1502 | 1504 | 1506B₁ | 1506B₂ | | 1506B_N | 1508 |

*Fig. 15B*

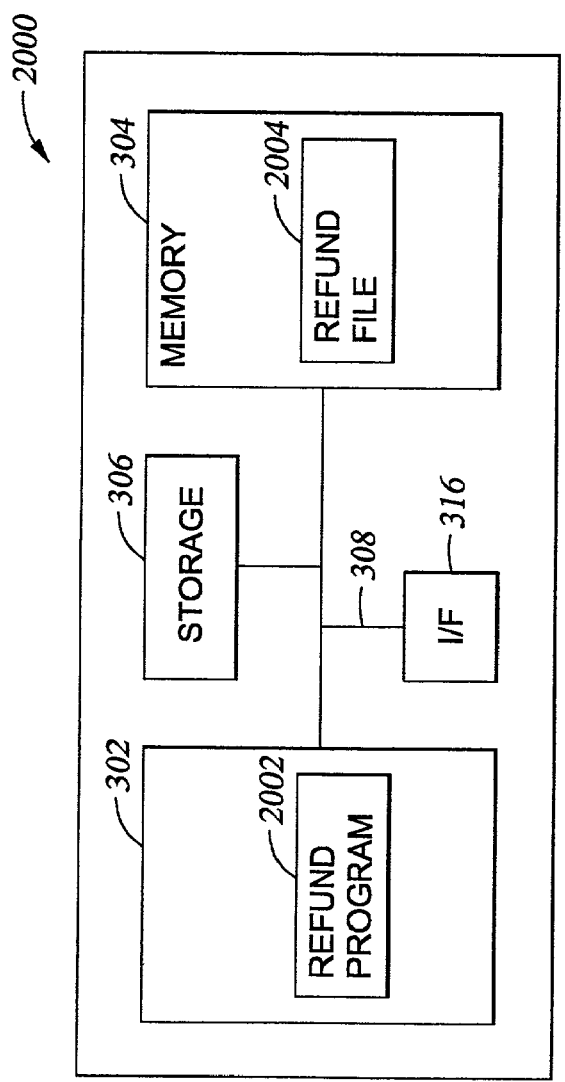

OPERATION OF CONTROL SYSTEM FOR ENSURING AVAILABILITY OF PURCHASABLE ITEMS IN NETWORKED MACHINES

BACKGROUND OF THE INVENTION

1. Field of the Invention

Embodiments of the present invention relate generally to vending machines. More particularly, embodiments relate to a method and apparatus for communicating inventory information between vending machines within a network.

2. Description of the Related Art

Vending machines are well known. Conventionally, vending machines have facilitated storage and dispensation of items such as cigarettes, postcards, drinks, candy, frozen deserts, snacks, video tapes, toys and the like. Such items are periodically loaded into a vending machine and then dispensed in response to a purchase order received from a user interfacing with a selection panel of the machine.

Traditionally, vending machines are located in factories, office buildings, bowling alleys and other high traffic locations. Vending machine operators have found that strategic location of vending machines in high traffic areas regularly frequented by the same customers, promote habitual sales and brand loyalty. As a result, vending machines have proved successful automated devices for sales of goods to customers.

Despite the success of vending machines, problems remain which jeopardize the effectiveness of such machines. One such problem is maintaining adequate inventory in the vending machines. Failure to keep machines stocked often results in loss of customer loyalty, thereby detrimentally affecting sales. In effort to maintain desired levels of inventory, vending machine management software has been implemented. One such software product is "Windows for Vending PRO with Inventory" produced by VendMaster. This product enables a vending machine operator to report and analyze various historical sales data. VendMaster's product is intended to enhance a vending machine operator's ability to identify high-demand inventory, determine times to stock the machine, and calculate suggested prices.

However, despite advances in vending machine management software, low inventory problems persist. As a result, customers are often unable to locate a particular item at any given vending machine. The customer is then forced to check other vending machines for the item, or must resort to a different venue altogether, e.g., a grocery store.

Another problem with conventional vending machines is that customers are often improperly charged. For example, in some cases items in a vending machine have been incorrectly loaded. Thus, a customer requesting Coca-Cola may instead receive Dr Pepper. In other cases, the item may become lodged in the dispensing slot so as to be irretrievable by the customer. In still other cases, the customer may receive a food item which has passed its expiration date. In each of these cases, the customer has already made a payment to the vending machine and is left with no immediate means for refund. If a refund is desired, the customer is forced to pursue tedious steps of contacting the vending machine owner and follow the refund policy implemented by the owner. In the end, the efforts expended by the customer far outweigh the value of receiving a refund.

Accordingly, what is needed is a method, system and article of manufacture for mitigating or eliminating the problems of the prior art in the area of vending machine technology.

SUMMARY OF THE INVENTION

Embodiments of the present invention generally provide methods, systems and articles of manufacture that facilitate solutions in the area of vending machine technology. One embodiment provides a method of operating a reservation control system for reserving items dispensed by vending machines networked to the reservation control system. The method comprises receiving, from a requesting computer, a reservation request for an item and determining whether the item is available at a vending machine. If the item is available, the item is reserved.

Another embodiment provides a reservation system for reserving items dispensed by vending machines. The reservation system comprises a memory containing a reservation program, a processor, and network interfaces to support a network connection with a client computer issuing a reservation request for a vending machine item and with at least one vending machine. When configured by the reservation program, the processor determines an availability of the vending machine item at the at least one vending machine and, if the vending machine item is available, reserves the item.

Yet another embodiment provides a signal bearing medium, comprising a reservation program which, when executed by a processor, performs a method for reserving items dispensed by vending machines. The method comprises receiving, from a requesting computer, a reservation request for an item; determining whether the item is available at a vending machine; and if the item is available, reserving the item.

BRIEF DESCRIPTION OF THE DRAWINGS

So that the manner in which the above recited features and embodiments are attained and can be understood in detail, a more particular description of embodiments of the invention, briefly summarized above, may be had by reference to the embodiments described below and which are illustrated in the appended drawings.

It is to be noted, however, that the appended drawings illustrate only typical embodiments of this invention and are therefore not to be considered limiting of its scope, for the invention may admit to other equally effective embodiments.

FIG. 10 is a data structure illustrating a location table.

FIG. 11 is a data structure illustrating a product table.

FIG. 12 is a data structure illustrating a reserved item table.

FIG. 13 is a data structure illustrating a missed sales table.

FIG. 14 is a data structure illustrating a free money table.

FIG. 15A is one embodiment of a data structure illustrating a non-refundable cost table.

FIG. 15B is one embodiment of a data structure illustrating a non-refundable cost table.

FIG. 20 is one embodiment of a vending machine configured to refund a customer for a corrupted sale.

FIG. 21 is a data structure illustrating a refund file.

DETAILED DESCRIPTION OF THE PREFERRED EMBODIMENTS

Figure 1:
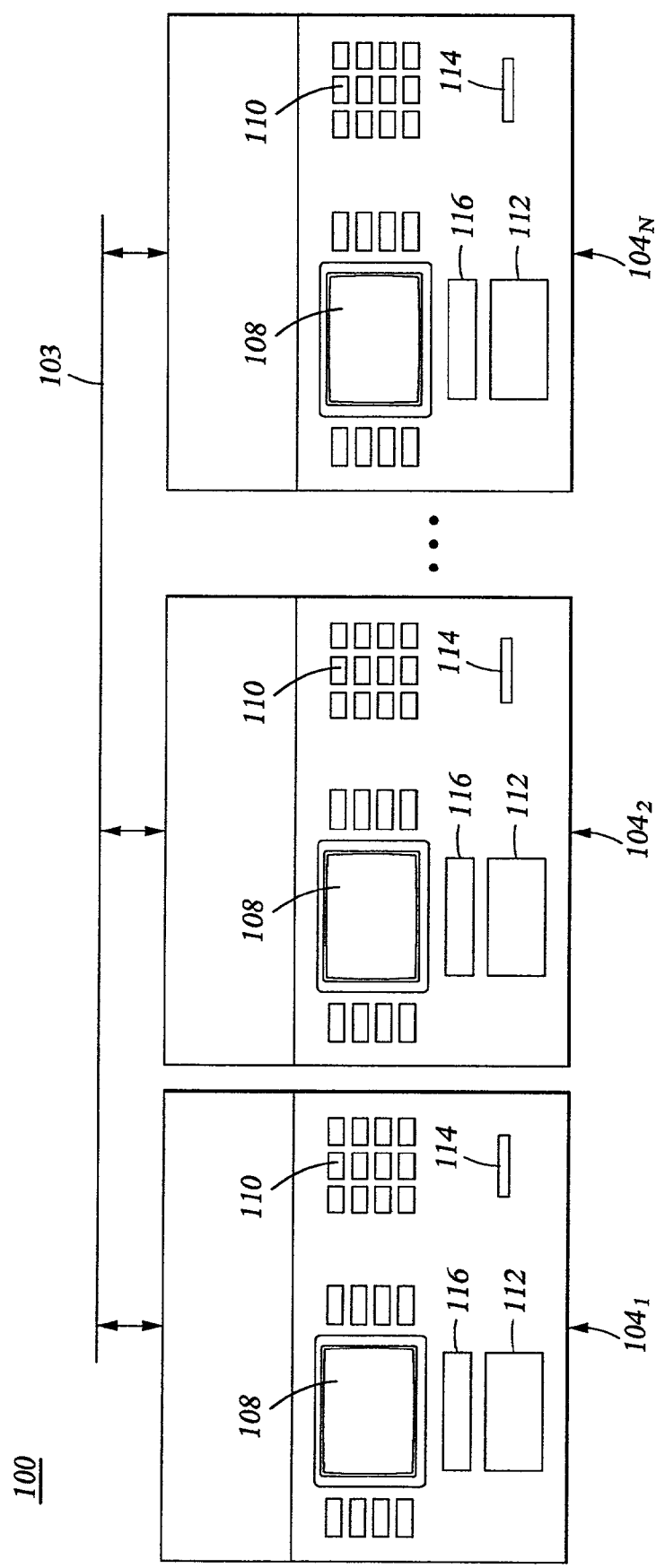
FIG. 1 is a diagram of one embodiment of a vending machine network.

Embodiments of the present invention provide for a method and system for operating vending machines. In general, a plurality of vending machines are nodes of a network. Each node is configured to send, receive and process signals carrying inventory, pricing, reservation and/or refund information. In particular, a first signal is sent to one or more nodes requesting inventory/price information from other nodes. Those nodes carrying the product may reply with a second signal. In this manner, the location of vending machines carrying one or more items specified by a customer may be determined.

In another embodiment, vending machine items may be reserved from a remote location. In such embodiments, a vending machine is configured to receive a reservation request for a specified item. The request may be issued from one of a plurality of client devices (e.g., wireless telephones, desktop computers and the like) or from a reservation control system.

In still another embodiment, vending machines may be configured to provide refunds. Refunds are selectively provided under controlled conditions. A consumer may request a refund in cases where the consumer was improperly charged for goods or services that were not provided.

One embodiment of the invention is implemented as a program product for use with a computer system such as, for example, the vending network environment 100 shown in FIG. 1 and described below. The program(s) of the program product defines functions of the embodiments (including the methods described below with reference to FIGS. 6, 8, 17-19 and 22) and can be contained on a variety of signal/bearing media. Illustrative signal/bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Item Locating and Pricing

FIG. 1 shows a vending network environment 100 comprising a plurality of vending machines $104_1, 104_2, \ldots 104_N$ connected to a network 103. The vending machines 104 may be configured to dispense any variety of goods such as food, drinks, tickets, toys, maps, stamps, etc. Illustratively, each vending machine 104 includes a magnetic credit/debit card reader 114, a cash acceptor interface 116, a dispensing slot 112, an input interface 110, and a display 108. Illustratively, the input interface 110 is a keypad. However, any device configured to allow a customer to input information into the vending machine 104 may be used. For example, in one embodiment, the input interface 110 may be configured to receive voice commands from a customer. The dispensing slot 112 is primarily provided to dispense the purchasable goods contained within the vending machine 104. However, in some embodiments, the dispensing slot 112 may also output printed material containing, for example, inventory information, pricing information and vending machine location information.

The network 103, as well as the connection between the vending machines 104 and the network 103, may include wire, radio, fiber optic cable, or any other device or method adapted to support a network connection. As such, the network 103 facilitates communication between the vending machines 104. In one embodiment, each vending machine 104 is a node connected to the network 103 and is assigned a unique address. The unique addresses allow each of the vending machines 104 to identify one another and exchange information.

Figure 2:
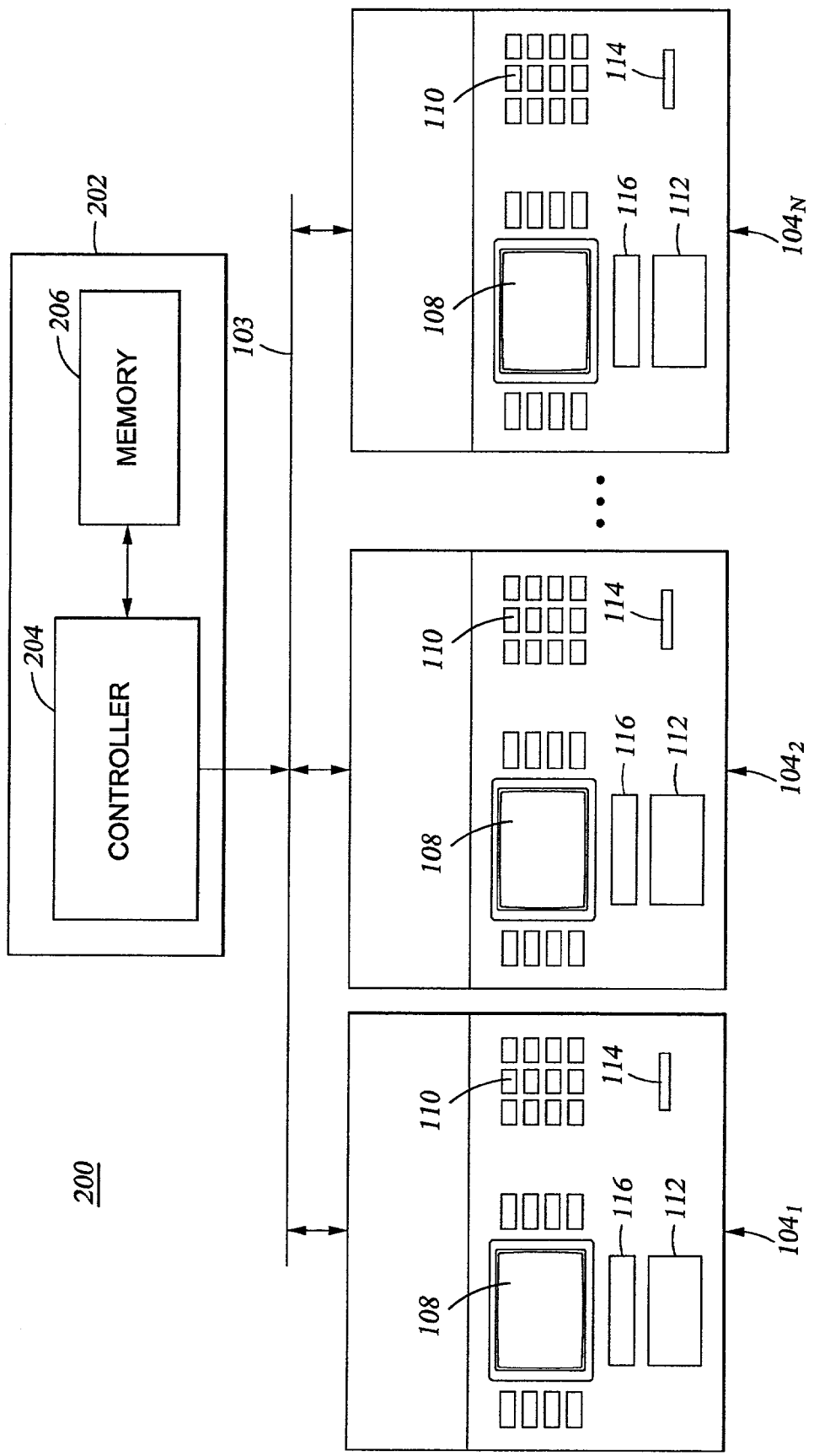
FIG. 2 is a diagram of another embodiment of a vending machine network.

FIG. 2 shows another embodiment of a network environment 200 in which the vending machines 104 are connected to a control system 202. In general, the control system 202 is any computerized device configured to receive/transmit control signals from/to the vending machines 104. In a particular embodiment, the control system 202 is implemented as a controller 204 and a memory/storage device 206. Although only one controller 204 is shown, the network environment 200 may in fact include multiple controllers. The memory device 206 provides a repository for information such as inventory, prices, vending machine locations and the like.

In operation, the vending machines 104 are configured to transmit item requests and responses between one another. In general, an item request may be transmitted in response to a purchase order made by a customer at one vending machine 104 that cannot satisfy the order. The failure to satisfy the purchase order may be due to, for example, a maintenance issue or the requested item being out of stock. Accordingly, the vending machine 104 at which the purchase order was made (the "requesting machine") transmits a request to fill the purchase order to the other vending machines 104 via the network 103. One or more vending machines capable of satisfying the order (the "responding machines") may respond. The requesting machine may then notify the customer of the replies received from the responding machines. In particular, the customer is provided with location information pertaining to the responding machines having the requested item in stock.

In the case of the network environment 100 shown in FIG. 1, the vending machines 104 are configured for direct communication between one another (i.e., a peer-to-peer architecture). In contrast to the distributed approach of the network environment 100, the network environment 200 of FIG. 2 illustrates a centralized implementation in which the control system 202 manages information exchange between the vending machines 104. It is understood, however, that the embodiments shown in FIG. 1 and FIG. 2 are merely illustrative. The particular configuration by which information is exchanged between vending machines is not limiting of the present invention, and persons skilled in the art will recognize other embodiments.

Figures 3, 4, 5:
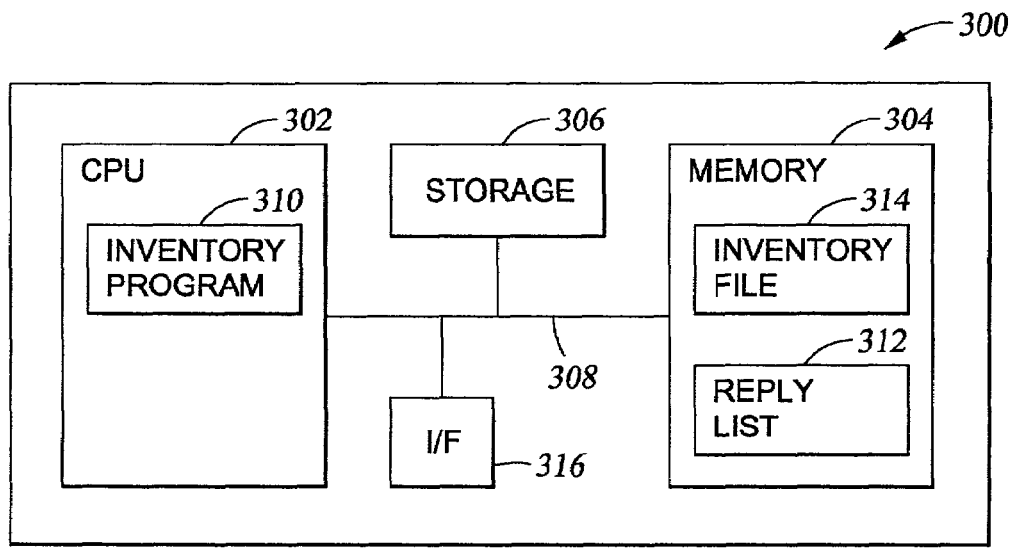
FIG. 3 is one embodiment of a vending machine configured to locate an item in a network of vending machines.
FIG. 4 is a data structure exemplifying an inventory file.
FIG. 5 is a data structure exemplifying a reply list.

FIG. 3 shows one embodiment of a vending machine 300 which may be used to advantage as a vending machine 104 of the network environments 100 and 200 described above with reference to FIGS. 1 and 2, respectively. The vending machine is particularly representative of a vending machine 104 in the network environment 100 of FIG. 1. In the case of a vending machine 104 in the network environment 200 of FIG. 2, some or all of the programs and data structures described with reference to FIG. 3 may reside on the control system 202. However, persons skilled in the art will readily appreciate such differences in the implementation and operation between the networks 100 and 200. Accordingly, a more detailed description of network 200 is not necessary.

In general, the vending machine 300 includes a central processing unit (CPU) 302, a memory 304 and a storage 306, each connected by a bus 308. The vending machine 300 may also include an interface 316 for external input/output devices. The CPU 302 is configured with an inventory monitor program 310, which may be loaded from memory 304 for execution. The memory 304 contains data structures which may be utilized by the inventory monitor program 310 during execution. Illustratively, the memory 304 contains a reply list 312 and an inventory file 314.

One embodiment of the inventory file 314 is shown in FIG. 4. The inventory file 314 comprises a plurality of records 402 containing item and price information. A record 402 is provided for each item carried by the vending machine 300. Accordingly, each record 402 includes an item entry 404. A default price for each item is contained in a price entry 406. In one embodiment, each record 402 also includes a maximum price entry 408. An availability entry 410 indicates the number of items in stock at the vending machine. Entries 412 indicate that each record 402 may comprise additional information.

One embodiment of the reply list 312 is shown in FIG. 5. The reply list 312 includes a plurality of records 502 each comprising a plurality of entries. In general, each record 502 contains information received from a remotely located vending machine 300 (i.e., one of the other networked vending machines). Illustratively, each record 502 includes an identification ("ID") entry 504, a price entry 506, a location entry 508 and a directions entry 510. Entries 512 indicate that each record 502 may include additional information.

The ID entry 504 is configured to contain information uniquely identifying a particular vending machine 300 in a network of vending machines. The machine designated by the information contained in a particular ID entry 504 may be referred to as a "responding machine", because the ID information is typically received in response to a request from a requesting machine. The price entry 506 contains a price for an item carried by the responding machine identified by the information contained in ID entry 504 in the same record 502. The location entry 508 specifies the location of the responding machine for the same record 502. The direction entry 510 contains directions to the location (per the information in the location entry 508) of responding machine for the same record 502. Illustratively, the directions may be in the form of a map and/or written directions. In some embodiments, a customer may dictate the level of detail provided by the directions, e.g., by requesting alternate routes and specifying an origination point (in one embodiment, the default origination point is the vending machine with which the customer is currently interacting). In another embodiment, a customer is given the option of downloading the directions onto, for example, a personal digital assistant (PDA). In this case, the vending machine with which the customer is interacting may provide the necessary hardware interface (e.g., interface 316) and supporting software to support the download.

During operation, the inventory monitor program 310 processes customer purchase orders for vending machine items. The item availability and price is indicated by the inventory file 314. If an item is available at a machine being interacted with a customer, the purchase order is processed in a normal manner and the item is dispensed accordingly. If the item is not available, steps are taken to locate the item at another machine. In addition, the price of the item may be adjusted.

Figure 6:
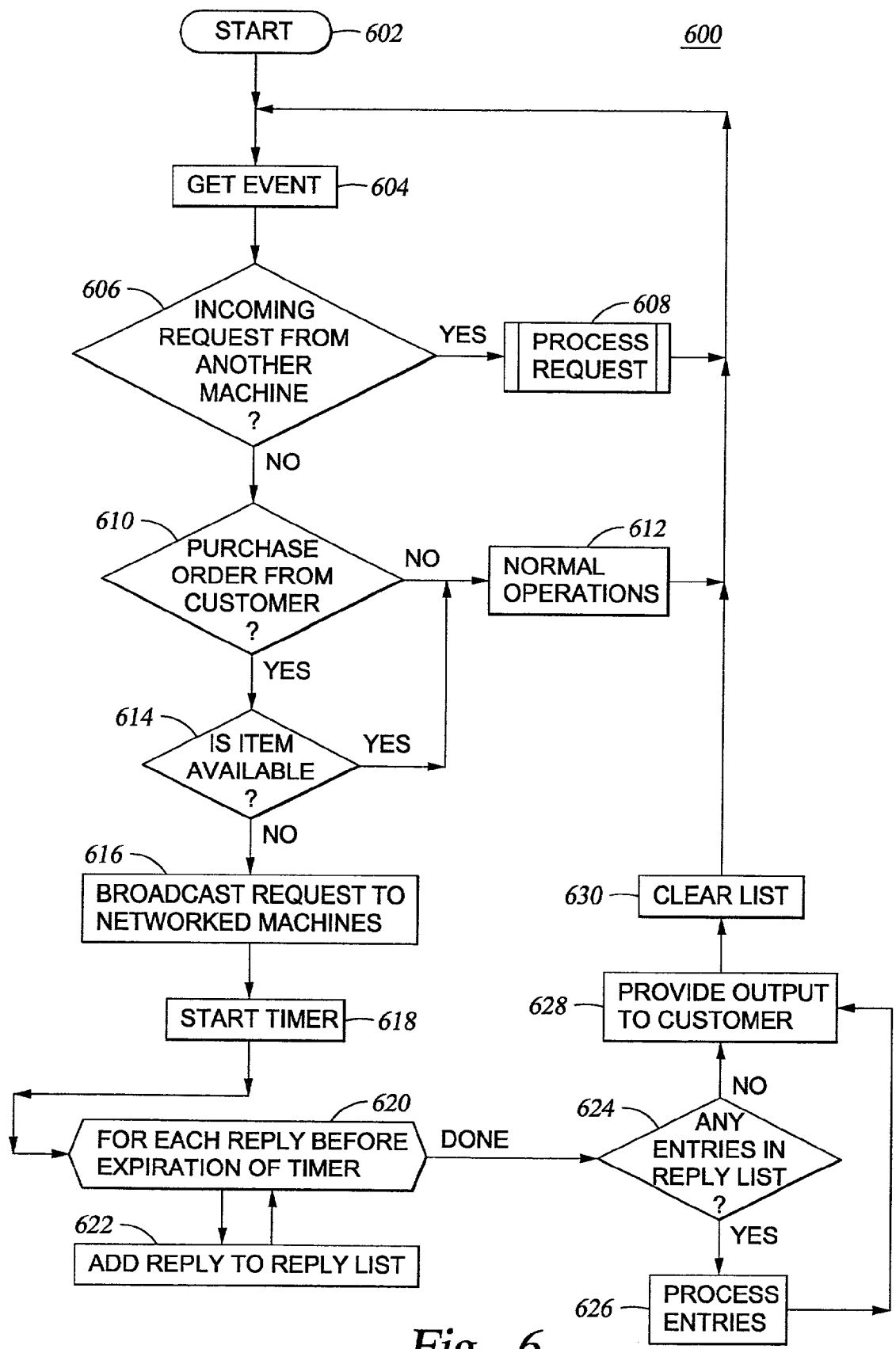
FIG. 6 is a flowchart illustrating the operation of a vending machine configured to process customer purchase orders as well as requests from other networked vending machines.

FIG. 6 shows a method 600 for operating a vending machine 104/300 in a network environment comprising a plurality of vending machines. Illustratively, the method 600 may be considered to represent the operation within either of the network environments 100 and 200, described above with reference to FIGS. 1 and 2, respectively. In general, the vending machine executing the method 600 is configured to either process requests from a customer or from another machine, e.g. another vending machine or the control system 202 shown in FIG. 2. For clarity, a vending machine processing customer requests will be referred to as a "local" machine while a vending machine processing a request from another machine will be referred to as a "remote" machine.

Method 600 is entered at step 602 which may represent a vending machine 104/300 being powered up and brought on-line with a network connection to a plurality of other vending machines. Method 600 then proceeds to step 604 to receive an event.

At step 606 the method 600 queries whether the event is an incoming request from another vending machine. If so, the request is processed at step 608. The method 600 then returns to step 604 to wait for another event. If step 606 is answered negatively, the method 600 proceeds to step 610.

At step 610, the method 600 queries whether the event is an item purchase order from a customer interacting with the local vending machine. If not, the event is handled at step 612 and the method 600 then returns to step 604. In this case, the processing at step 612 may include, for example, issuing a service/maintenance request, updating item pricing information and the like. If step 610 is answered affirmatively, the method 600 proceeds to step 614 to determine the item availability at the local machine. To this end, the local machine references the availability entry 410 for the appropriate item (indicated by the item entry 404) in the inventory file 314. If the item is available at the local machine, the purchase order is processed at step 612 in a conventional manner. Method 600 then returns to step 604.

If the requested item is not available at the local machine, steps are taken to determine item availability at remote networked vending machines. As such, a request for the item is transmitted to one or more remote vending machines at step 616. In one embodiment, the request is broadcast to all remote vending machines connected to a common local area network (LAN). Alternatively, the request is provided to selected vending machines connected to a LAN. For example, the customer may be given the option to select one or more remote vending machines according to his or her preference. In some cases, the customer may provide a proximity parameter to restrict recipients of the request. For example, the customer may specify that only those remote vending machines within a 50 meter radius receive the request.

At step 618, the method 600 initiates a timer. The timer defines some period of time during which replies received from remote machines are accepted by the local machine. At step 620, the method 600 prepares to receive replies. Each reply received before the expiration of the timer is added to the reply list 312, as indicated by step 622. Once the timer expires, the method 600 proceeds to step 624 and queries whether the reply list 312 contains any entries (i.e., replies from remote machines). If so, the entries are processed at step 626. The manner in which entries are processed may be determined, in part, by customer specified options. For example, if the customer specified a proximity parameter, only the requests received from remote machines satisfying that parameter are considered. Alternatively, the entries may be processed according to default parameters. For example, the local machine may be configured to select the closest remote machine having the item.

Once the reply list entries are processed at step 626, or if no replies where received at step 624, the results are provided to the customer at step 628. If the item was located at one or more remote machines, the customer may be provided with the item price and the location/direction of/to the remote machine(s). The reply list 312 is then cleared at step 630 and the method 600 returns to step 604 to receive additional events for processing.

Figures 7, 16:
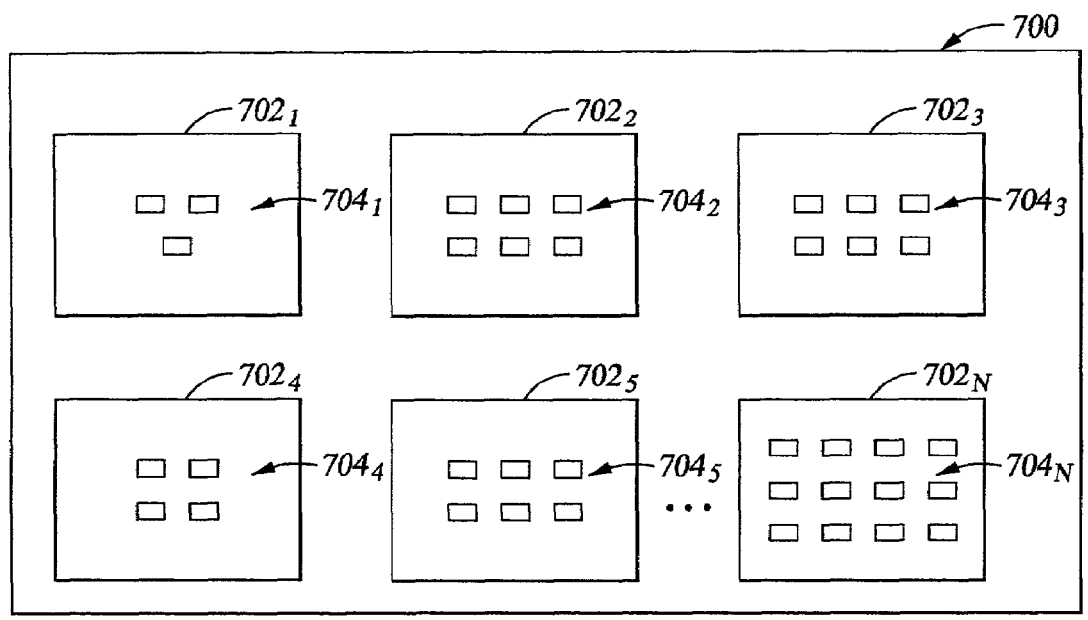
FIG. 7 is a diagram of a networked vending machine environment.
FIG. 16 is a graphical user interface configured to receive reservation information.

In one embodiment, the item request may be broadcast to certain sectors of a vending machine network. The determination of which sectors to broadcast to may be dynamically determined according to whether the item has been located. This approach may be illustrated with reference to FIG. 7. FIG. 7 shows a network environment 700 comprising a plurality of sectors or clusters $702_1$, $702_2$, . . . $702_N$ (collectively referred to as 702). Illustratively, the clusters 702 may be representative of physical structures such as buildings or may simply be representative of a defined geographic area. In a particular embodiment, the network environment is implemented in a stadium, concert hall, convention center or other large facility capable of holding a large capacity crowd. The clusters 702 are then areas of the facility each hosting at least one vending machine. Illustratively, each cluster 702 contains a plurality of vending machines $704_1$, $704_2$, . . . $704_N$ (collectively referred to as 704). Each individual vending machine of a given plurality of vending machines 704 is networked to one another as well as to each of the other pluralities of vending machines 704. In one embodiment, the scope of the search for a particular item may be restricted to the cluster 702 at which the purchase order originates. Consider, for example, a customer interfacing with one of the plurality of vending machines $704_1$ of a first cluster $702_1$. If the vending machine being interfaced with does not to have the item requested, a request for the item may be broadcast to each of the other machines of the plurality of vending machines $704_1$ in the cluster $702_1$. If none of the other vending machines $704_1$ in the cluster $702_1$, can satisfy the purchase order, a request may be broadcast to one or more of the other clusters 702. In a particular embodiment, the request is broadcast to the next closest cluster 702 (with respect to the local machine with which the customer is interfacing). This pattern may be repeated until the item is located at one of the clusters 702 or until all clusters have been exhausted unsuccessfully.

The foregoing embodiment is merely illustrative and persons skilled in the art will readily recognize other embodiments. In particular, it is understood that an item request may simply be broadcast to all vending machines on a network. Alternatively, and as previously discussed, the customer may specify a proximity parameter that dictates the scope of the broadcast.

Figure 8:
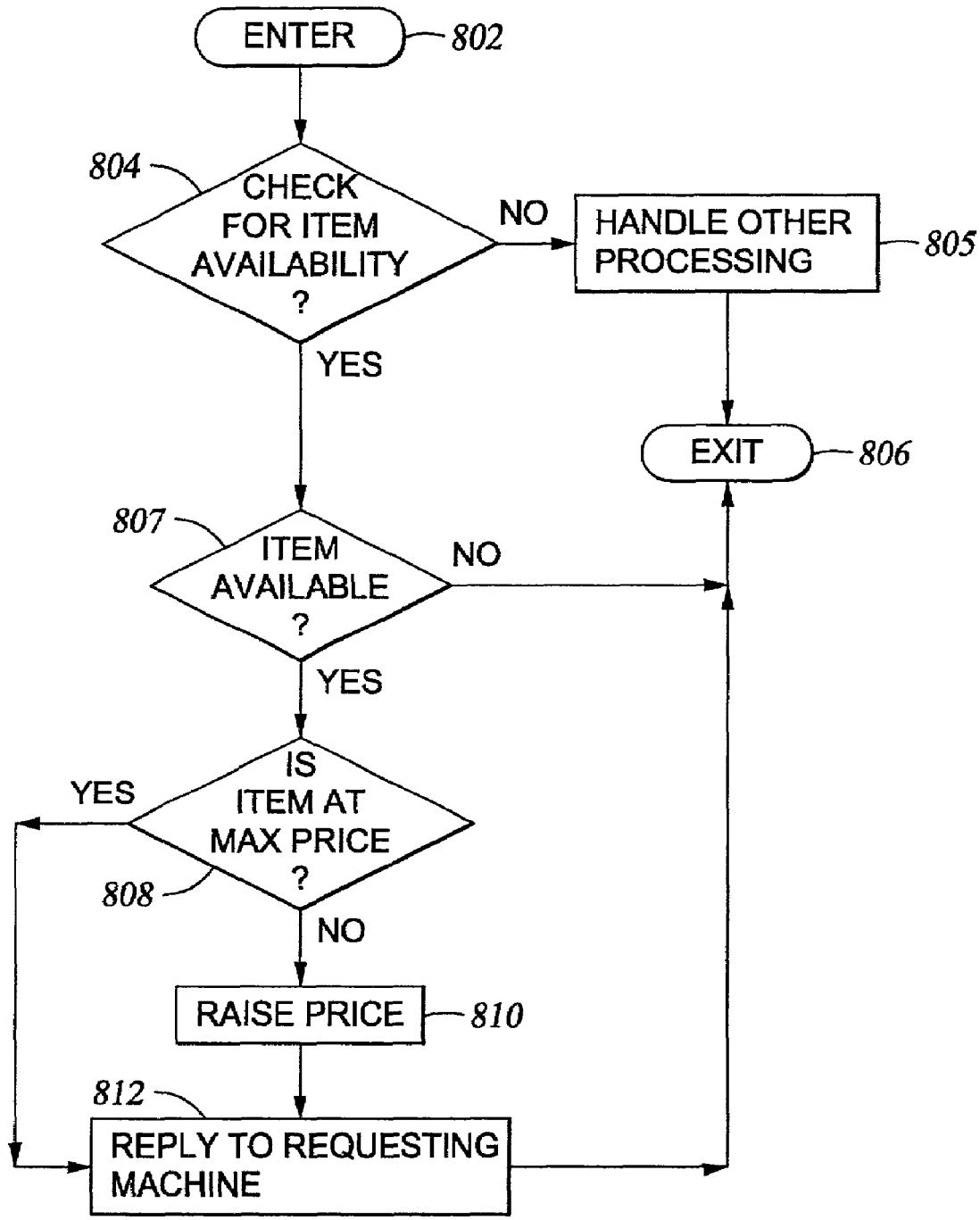
FIG. 8 is a flowchart illustrating the operation of a vending machine responding to a request received from a remotely located networked vending machine.

FIG. 8 shows a method 800 representing one embodiment of step 608 for processing a request received from another vending machine. Method 800 is entered at step 802 and proceeds to step 804 to query whether the incoming request is to check for item availability. If not, the method 800 proceeds to step 805 to handle the request and then exits at step 806, in which case processing returns to step 604 shown in FIG. 6. If the request is to determine item availability, the method 800 proceeds to step 807.

At step 807, the method 800 queries whether the item is in stock at the machine that is processing method 800. If not, the method 800 exits at step 806. In this case, the responding machine may also indicate to the requesting machine (i.e., the local machine) the item is not available at the responding machine. If the item is available at step 807, then the method 800 proceeds to step 808.

At step 808, the method 800 queries whether the price for the requested item is set at its maximum price. The maximum price for any given item is contained in the maximum price entry 408 of the inventory files 314. In the present embodiment, the price of an item is specified either by the price contained in the default price entry 406 or the price contained in the maximum price entry 408. Illustratively, the price to be charged for a particular item is specified by flagging the appropriate entry 406 or 408. Accordingly, the determination at step 808 is made by identifying which entry 406,408 is flagged. Although the inventory file 314 shown in FIG. 4 provides only two possible prices, other embodiments include any number of prices in a range of prices.

If query 808 is answered negatively, the price of the item may be raised (e.g., to the maximum price or any other price provided by the inventory file 314) at step 810. The determination to raise a price may include, for example, an inventory assessment of all other vending machines on a common network. If the inventory assessment indicates a relatively low inventory for a particular item, then the price may be raised. In addition, each vending machine connected to a network may maintain the same price for any given item. Accordingly, if the price is raised at any single vending machine, the adjusted price is broadcast to each of the other machines on the network. In this manner, the prices of items carried by vending machines of a particular network reflect the real-time realities of supply and demand.

Once the price for an item has been raised at step 810, or if the item price is already at its maximum price at step 808, the method 800 replies to the requesting machine at step 812. Illustratively, the reply indicates that the responding machine carries the item and may also indicate the price of the item. In addition, the reply preferably includes a unique ID for the responding machine as well as location/directions for the responding machine. The method 800 then exits at step 806.

Reservation System and Method for Vending Machine Items

In some embodiments, a customer is given the option of reserving an item carried by a vending machine. For example, in the foregoing embodiments in which an item was located at one or more remote machines, a customer may input a reservation command to the local machine in order to hold the item at the remote machine(s) for a period of time. Embodiments for reserving an item are described in more detail below.

Figure 9:
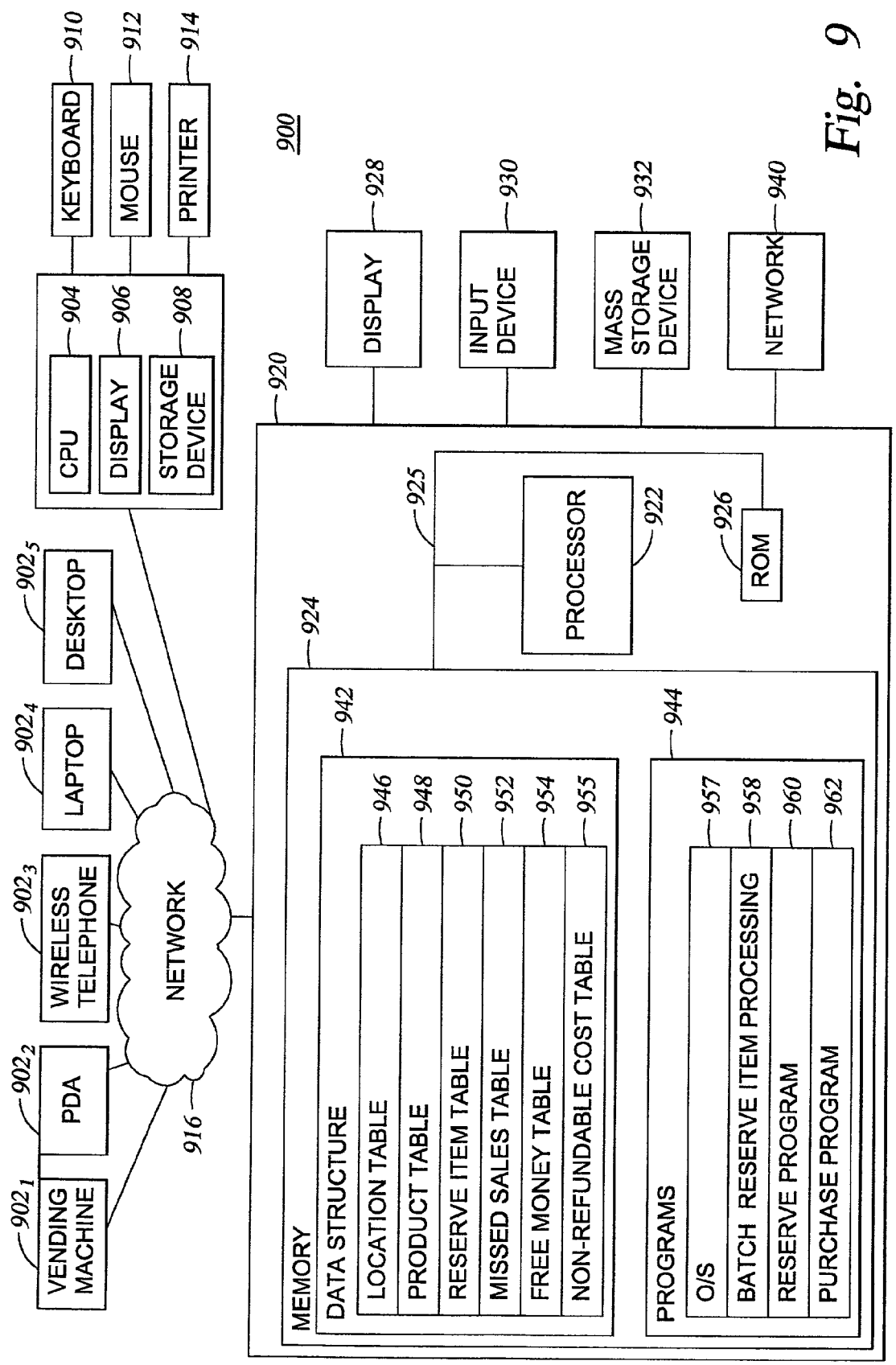
FIG. 9 is a diagram of a reservation system for reserving items at a vending.

FIG. 9 shows a system 900 which is an exemplary embodiment of a reservation system. System 900 has a plurality of input devices $902_1, 902_2, \ldots 902_N$ (collectively referred to as input devices $902_N$). Illustratively, the input devices $902_N$ include a vending machine $902_1$, a personal digital assistant (PDA) $902_2$, a wireless ("cell") phone $902_3$, a laptop $902_4$, and a desktop $902_5$. Each input device $902_N$ may include a central processing unit (CPU) 904, a number of peripheral components, such as a computer display 906, a storage device 908, a printer 914, and various input devices (e.g., keyboard 910 and mouse 912). Each input device $902_N$ is connected to a network 916. Network 916 may represent any type of networked and public networks (e.g., the Internet). Moreover, any number of computers and other devices may be networked through network 916.

The network 916 connects the input device $902_N$ to a central control system 920. The central control system 920 may represent any type of computer, computer systems or other programmable electronic device, including a client computer (e.g., similar to input devices $902_N$), a server computer, a portable computer, a handheld computer, an embedded controller, a network of computers, etc. In one embodiment, the control system 920 is an embodiment of the control system 202 described above with reference to FIG. 2.

The central control system 920 illustratively includes at least one processor 922 coupled to memory 924 and read only memory (ROM) 926 via a bus 925. Processor 922 may represent one or more processors (e.g., microprocessors), and memory 924 may represent the random access memory (RAM) devices, comprising the main storage of the central control system 920, as well as any supplemental levels of memory, e.g., cache memories nonvolatile or backup memories (e.g., programmable or flash memories), read only memories, etc. In addition, memory 924 may be considered to include memory storage physically located elsewhere in central control system 920, e.g., any cache memory in processor 922, as well as any storage capacity used as a virtual memory, e.g., as stored on a mass storage device 932 or on another computer coupled to the central control system 920 via network 916.

Central control system 920 also illustratively receives a number of inputs and outputs for communicating information externally. For interface with a user or operator, central control system 920 includes one or more user input devices 930 (e.g., a keyboard, a mouse, a trackball, a joystick, a touch pad, and/or a microphone, among others).

For additional storage, central control system 920 may also include one or more mass storage devices 932, e.g., a floppy or other removable disk drive, a hard disk, a direct access storage device (DASD), an optical drive (e.g., CD drive, a DVD drive, etc.) and/or a tape drive among others. Furthermore, central control system 920 may include and interface with one or more networks 940 (e.g., a LAN, a WAN, a wireless network, and/or the Internet, amongst others) to permit the communication of the information with other computers coupled to the network. It should be appreciated that the central control system 920 may include suitable analog and/or digital interfaces between processor 922 and each of the other components of the central control system 920 and is well known in the art.

Central control system 920 operates under the control of an operating system ("O/S") 957, and executes or otherwise relies upon various computer software applications, components, programs, objects, modules, data structures, etc. Illustratively, a plurality of data structures 942 include a location table 946, a product table 948, a reserved item table 950, a missed sales table 952, a free money table 954, and non-refundable table 955. One or more of the data structures 942 may be periodically updated with information from one or more of the client computers $902_N$. In particular, the product table 948 may be updated with information from the vending machine $902_1$ (e.g., with item availability/quantity information). Illustrative programs 944 include a batch reserve item processing program 958, a reserve program 960, and a purchase program 962. Moreover, various applications, components, programs, objects, modules, etc. may also execute on one or more processors in another computer coupled to the central control system 920 via a network 916, in a distributed or client-server computing environment, whereby the processing required to implement the functions of a computer program may be allocated to multiple computers over the network.

Those skilled in the art will recognize that the exemplary environments illustrated in FIG. 9 are not intended to limit the present invention. Indeed, those skilled in the art will recognize that other alternate hardware and/or software environments may be used without departing from the scope of the invention.

FIGS. 10-15 depict embodiments of the data structures 942. Each data structure is organized as a plurality of rows and columns. The columns designate a particular category of information while each row comprises a record in the data structure. For simplicity only one row/record of each data structure is shown. However, it is understood that the data structures may each comprise a plurality of rows/records.

FIG. 10 illustrates an embodiment of the location table 946 containing location records. Each location record comprises a location identification ("ID") entry 1002, a physical location entry 1004, and a description entry 1006. An entry 1008 is representative of other entries which may be included in other embodiments. The location ID entry 1002 contains a unique identifier for all vending machine locations in a collection of vending machines. In one embodiment, the location ID entry 1002 contains a network address for a vending machine. In an Internet-based implementation the network address is an Internet Protocol (IP) number. The physical location entry 1004 is a representation of the physical location of the vending machine. Illustratively, the physical location may be a longitude or latitude, a Global Polishing System ("GPS") coordinate, a street address, a building address, a grid map coordinate used to map out the internals of a building, etc. Description entry 1006 is a brief description of the machine at the specified location (e.g., maintenance history, operator, manufacturer, etc.).

FIG. 11 illustrates an embodiment of the product table 948. The product table 948 is a central repository of all products found within all vending locations. Each record of the table 948 corresponds to a particular item type at a particular location. The table 948 comprises a location ID entry 1102, an item ID entry 1104, a quantity available entry 1106, a quantity reserved entry 1108, and a price entry 1110. An entry 1112 is representative of other entries which may be included in other embodiments. The location ID entry 1102 contains an address provided from one of the location ID entries 1002 and corresponds to a location where the item specified by the record is available. The item ID entry 1104 is used as a unique identifier to differentiate amongst products. The quantity available entry 1106 is the number of items available at the specified location. The quantity reserved entry 1108 is the number of items that have been reserved at the specified location. The difference between the quantity reserved and the quantity available indicates how many available items are available for purchase. The price entry 1110 indicates the price of the specified item (item ID entry 1104) in the specified location (location entry 1102).

FIG. 12 illustrates an embodiment of the reserved item table 950. The reserved item table 950 identifies all items within all locations that have been reserved. Illustratively, the reserved item table 950 comprises a location ID entry 1202, an item ID entry 1204, a customer ID entry 1206, a quantity entry 1208, a payment form entry 1210, a data and time entry 1212, a non-fundable flag entry 1214, a non-refundable cost entry 1216, a pre-paid entry 1218 and a confirmation number entry 1220. An entry 1222 is representative of other entries which may be included in other embodiments. The location ID entry 1202 is a unique identifier that represents the location of an item being reserved and may be any of the locations specified by the location ID entries 1002. The item ID entry 1204 is a unique identifier that represents the item being reserved and corresponds to one of the identifiers contained in item ID entry 1104. The customer ID entry 1204 is an optional column used to contain customer information such as a credit card number, a physical address, a social security number, etc. The quantity entry 1208 is the number of items (entry 1204) that are on reserve. The payment form entry 1210 is a representation of how the item was or will be paid for. The payment form can be any of cash, coin, credit card, debit card, charge via phone etc. The date and time entry 1212 is used to keep track of when the consumer is scheduled to pick up the reserved item. In general, the data and time is specified by the consumer or a vending machine operator. In one embodiment, an arbitrary grace period may be added to the date and time to allow the consumer some additional time to pick up the item. The non-refundable flag entry 1214 is used by an item distributor to charge the consumer a non-refundable processing fee if the item being reserved is not picked up by the time/date specified in the data and time entry 1212. The non-refundable cost entry 1216 is an amount the customer is charged if the non-refundable flag is turned on (set to YES) and the specified time/date criteria are not satisfied by the customer. The pre-paid entry 1218 indicates whether the item has been pre-paid (i.e., paid for prior to item pickup). If so, then the non-refundable flag is set to NO. Thus, the assessment of a non-refundable cost may be made dependent on whether a customer pre-pays for an item. However, in other embodiments a customer is charged a non-refundable cost whether or not pre-payment is made. Further, the non-refundable cost may be incrementally increased the longer the item is placed on hold. Each of these embodiments are further described below with reference to FIGS. 15A-B. The confirmation number entry 1220 contains some value or values representative of a particular reservation request. In one embodiment, the confirmation number is some combination of the values contained in the other entries of the reserved item table record. The number is provided to a customer if the reservation request is accepted by the reservation control system 920. The customer may then use the number to pickup the reserved item at a future time.

In one embodiment, reserving an item and prepaying for the item may result in a discount for the consumer, since this guarantees a sale to the distributor regardless of whether the item is picked up or not. Other incentive plans and features may also be provided.

FIG. 13 illustrates an embodiment of the missed sales table 952. The missed sales table 952 contains data used by a distributor to track items that could have been sold. Illustratively, the missed sales table 952 comprises a location ID entry 1302, an item ID entry 1304, a missed quantity entry 1306, and a reason entry 1308. An entry 1310 is representative of other entries which may be included in other embodiments. The location ID entry 1302 is the unique machine location identifier described with reference to the location ID entry 1002 of the location table 946. The item ID entry 1304 is the unique item identifier described with reference to item ID entry 1104 of the product table and represents an item that could not be sold. The number of items that could not be sold is contained in the missed quantity entry 1306. The reason description entry 1308 contains a brief description explaining why the item could not be sold. For example, the item may have been out of stock when a purchase request was made. This information may then be used for marketing and sales analysis.

FIG. 14 illustrates one embodiment of the free money table 954. In general, the free money table 954 contains data used by a distributor to keep track of money the distributor makes without actually selling a product. An entry is added to this table for all non-refundable processing fees and all items that where pre-purchased and not picked up. Illustratively, the free money table 954 comprises a location ID entry 1402, an item ID entry 1404, a quantity entry 1406 and a price entry 1408. An entry 1410 is representative of other entries which may be included in other embodiments. The location ID entry 1402 contains the unique location identifier described with reference to the location ID entry 1002 of the product table 946. The item ID entry 1404 contains the unique item identifier (entry 1104 of the product table 948) that represents the item being reserved. The number of items that were not sold is contained in the quantity entry 1406. The corresponding price of the unsold items, or the non-refundable processing fee associated with the item, is contained in price entry 1408.

FIG. 15A illustrates a first embodiment of the non-refundable cost table 955 and is represented as table 955A. The non-recoverable cost table 955B is used and maintained by a distributor to determine non-recoverable costs for given items. Illustratively, the non-refundable cost table 955B comprises a location ID entry 1502, an item ID entry 1504, and a non-recoverable cost entry 1506A.

FIG. 15B illustrates a second embodiment of the non-refundable cost table 955 and is represented as table 955B.

In this case, the table 955B is configured as a series of incremental non-refundable costs that may be charged to the customer. In particular, the incremental cost is a function of time such that the cost increases with increasing time. Accordingly, the longer that a customer waits to pick up a reserved item the greater the cost penalty associated with the item. In this manner, the seller is insured against losses in revenues due to lost opportunity costs.

Illustratively, the non-refundable cost table 955B comprises a location ID entry 1502, an item ID entry 1504, and a plurality of incremental time/cost entries $1506B_1$, $1506B_2$, . . . $1506B_N$. Each incremental time/cost entry $1506B_N$ corresponds to a time range and associated cost. The time ranges are consecutive for each successive entry. For example, a first entry $1506B_1$ may be for a time range of 0-0.9 hours, a second entry $1506B_2$ may be for a time range of 1.0-1.9 hours, and so on. The units of time and the length of the ranges may be determined according to implementation. The increase in the cost from each successive entry may be linear, exponential or otherwise.

The incremental cost may be referred to herein as a "penalty". In one embodiment, the penalty accrues from the time of the reservation but is only imposed if the item is not picked up by the reserving customer. Alternatively, the penalty may be in addition to the purchase price of the item as a service charge, regardless of whether the item is picked up. In still another embodiment, a penalty does not begin accruing until expiration of a designated pick-up time (specified by the customer or the seller). In some cases, an upper limit for the penalty is set. In one embodiment, the reserved status of the item is removed when the upper limit is reached, thereby making the item available for sale to other customers. Alternatively, in the case of perishable items for example, the upper limit is set equal to the cost of the item and is configured to be reached on the expiration date of the perishable item.

In operation, the data structures 942 are used to facilitate reservation/purchase of items contained in the vending machines $902_1$. In particular, the data structures are used by the programs 958, 960 and 962. The data structures and the programs are described in more detail below.

In one embodiment, any of the client devices $902_N$ may be configured with a graphical user interface (GUI) adapted to facilitate reserving vending machine items. In general, the GUI enables a user to select a pickup location and one or more items via a menu interface. FIG. 16 is an exemplary graphical user interface (GUI) 1600 which may be used to advantage by a consumer to carry out a reservation operation. The GUI 1600 can be operated by any input device such as a keyboard, a mouse, a touchpad or voice recognition technology.

Illustratively, the GUI 1600 includes a plurality of dropdown boxes each including one or more user selectable options. The dropdown boxes are merely illustrative of features provided by a particular embodiment and other embodiments may have some combination less than all of the dropdown boxes shown, or may have additional dropdown boxes. A location dropdown box 1620 contains all possible vending machine locations that are available. A user may then select one or more locations at which to reserve an item for purchase. It is contemplated that a more complex menu system may be provided; e.g., a map showing all locations could be provided and clicking the mouse over a location on the map would be equivalent as entering the location. A selection is provided for each location ID entry 1002 of the location table 946. The location could also be defaulted to the nearest machine and/or the list contained with the dropdown box could be ordered by location.

An item dropdown box 1640 will be populated once a location is selected from dropdown box 1620. Until a location is selected from dropdown box 1620 the dropdown box 1640 is disabled. Once enabled, dropdown box 1640 provides a list of all available products available from the location(s) specified by the dropdown box 1620. In other embodiments, the item dropdown box 1640 may be implemented as a screen with product images. A user then selects an item(s) for reservation by clicking on an image of the appropriate item. In one embodiment, the user may also be provided with product information such as return dates (in the case of video rentals), warranty information, rebate information and the like. In still another embodiment, the user selects an item from the item dropdown box 1620 and then selects a location from the location dropdown box 1620 wherein only the locations having the item available are shown.

Once an item has been selected, a quantity window 1650 is made available. The window 1650 allows the consumer to enter the number of items to be reserved. In one embodiment, the window may indicate a number of the selected items currently available.

A pre-pay check box 1660 will allow the user to prepay for the item(s). It is contemplated that by checking check box 1660 a discount may be provided to the consumer. In one embodiment, if check box 1660 is not checked, then the consumer is charged a processing fee if they do not pick up or purchase the reserved item within a specified time. The specified time may be entered using a date box 1665 and a time box 1667 are used to enter the data and time, respectively, of the intended pickup of the product(s) being reserved. In one embodiment, the date and time may be provided by the machine executing the GUI 1600, rather than allowing the consumer to specify the date/time.

If the consumer indicates a desire to pre-pay, then a payment form window 1662 is made active. The window 1662 provides a list of possible payment forms including, for example, a selection of credit cards. In addition, entries may be provided within window 1662 in which to enter credit card information.

After entering the reservation order information, the user then clicks an Enter button 1680 to accept the order or a Cancel button 1685 to cancel the order. In the event the Enter button is pressed, processing of the data is then performed and a result is returned in the message area 1690. It is also contemplated that instead of a textual message form, the machine providing the GUI 1600 could print out the transaction in the form of a receipt or provide an auditory output.

Figure 17:
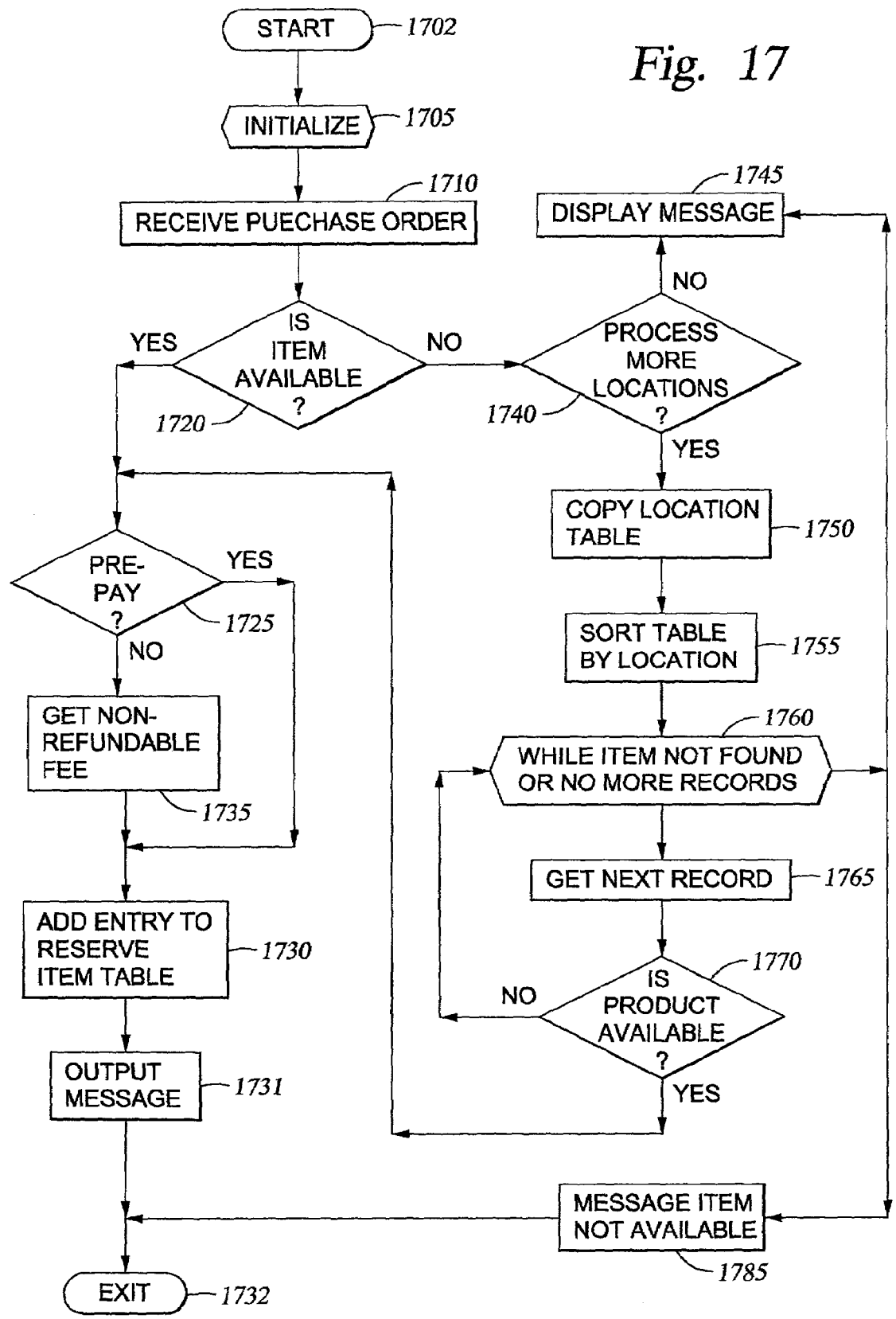
FIG. 17 is a flowchart illustrating a method for handling reservation requests.

FIG. 17 depicts a method 1700 for handling input requests for reserving items. Illustratively, method 1700 is entered into at step 1702 when the consumer launches the reservation program 960 via, for example, the GUI 1600.

Initialization work is done by the program 960 at step 1705. When the user executing program 960 clicks the enter button 1680 the program 960 proceeds to step 1710 where the reservation order information input to the GUI 1600 is received.

At step 1720, method 1700 determines if the item (and quantity) being requested is available. Thus, a reference to entry 1106 of the product table 948 is made using the specified items and location IDs. If the item is available, method 1700 proceeds to step 1725 to query whether the consumer has elected to pre-purchase the item. If so, the item is added to the reserved item table 950 at step 1730. At step 1731, a message is output to the message area 1690 to inform the consumer that the item has been reserved. In addition, the message may include a confirmation number (stored to the confirmation number entry 1220) which the consumer may use to pick up the item at a future time. The method 1700 then exits at step 1732.

If, at step 1725, the item is not pre-purchased then method 1700 proceeds to 1735 to get a non-refundable fee amount from the non-refundable cost table 955A. The non-refundable fee is retrieved from the non-refundable cost table 955A and will be charged to the customer if the consumer does not pick up the intended item within a specified time period (as indicated by date and time checkboxes 1665 and 1667, respectively). At step 1730, the purchase order information (e.g., location ID, item ID, item quantity, date/time information, pre-pay information, and payment form) is included in a record and entered as a row in the reserved item table 950. If the consumer has prepaid then the flag in entry 1214 of the record is set to "Y". At step 1731, a message is output to the message area 1690 to inform the consumer that the item has been reserved. The method 1700 then terminates at step 1732.

Referring back to 1720, if the item is not available then the user is asked if they would like to process additional locations for the item. This may be done by outputting a message to the message area 1690. If the user desires not to process more locations, e.g., by clicking the cancel button 1685, method 1700 proceeds to step 1745. At step 1745 a "thank you" message may be output to the message area 1690 and the method 1700 is exited at step 1732.

If the user desires to process more locations the ENTER button 1680 is pressed and method 1700 continues to step 1750 where the location table is copied. At step 1755, the location table 946 is sorted by proximity of location relative to a current location (i.e., the location of the customer). Method 1700 then proceeds to loop through all locations at step 1760, processing the data in order such that the first available item found will break the loop. Specifically, method 1700 loops by retrieving a location record at step 1645 and determining whether the item is available at the specified location at step 1770 (by checking the product table 948). If the item is not available, method 1700 returns to step 1760. In this manner, the loop continues until all location records are exhausted.

If the item is not located, then the loop eventually ends by exiting to step 1785 where a message is output to the consumer indicating that the item is not available. If at any time during the loop the product is found, then the method 1700 proceeds to step 1725 to query whether the consumer has elected to pre-pay (by activating checkbox 1660). Step 1725 and subsequent steps have been described above.

Figure 18:
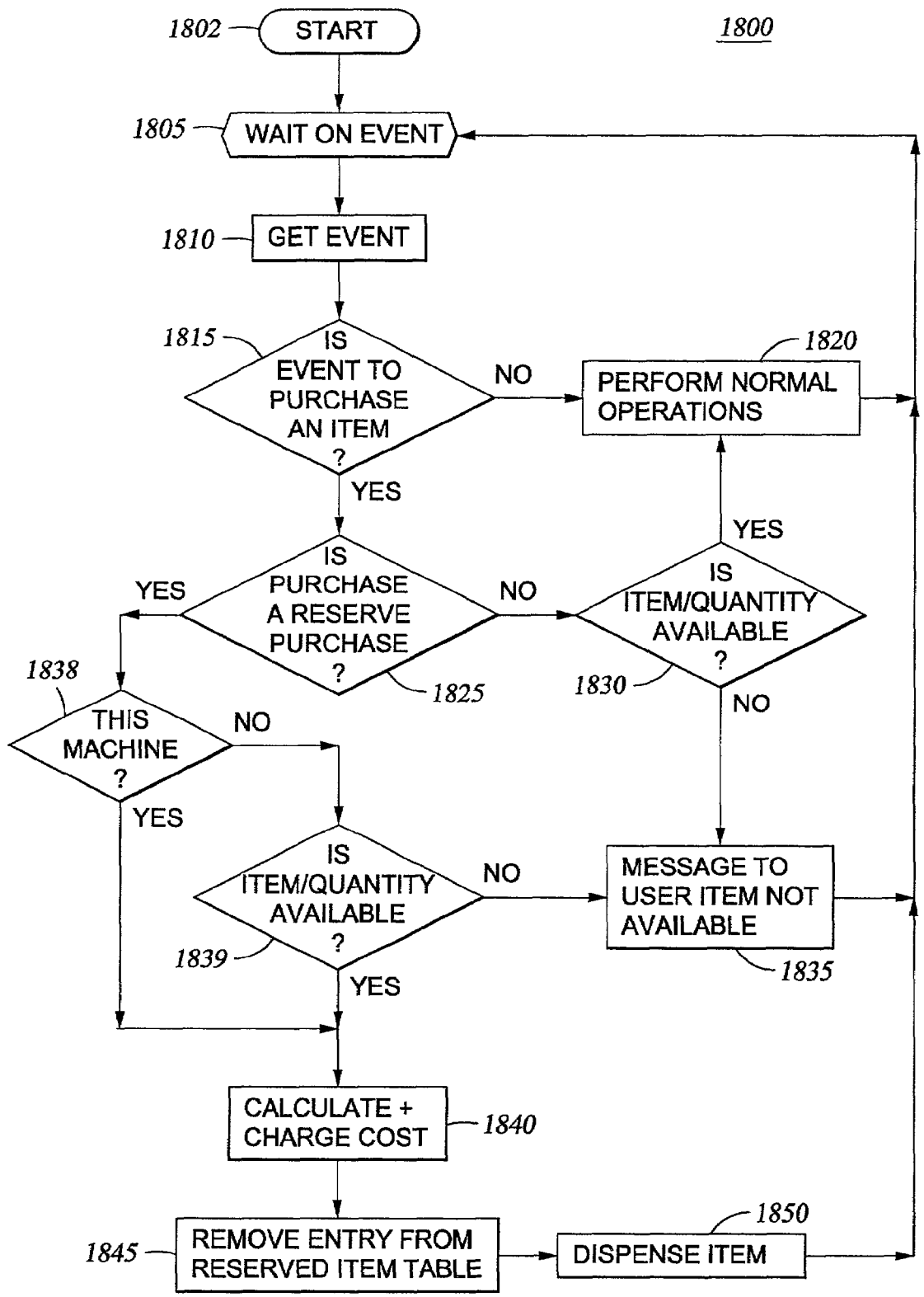
FIG. 18 is a flowchart illustrating a method for purchasing items at a vending machine.

FIG. 18 depicts a flow diagram of a method 1800 for handling purchases of items at a vending machine 902₁. The purchases may be for reserved items (i.e., items reserved via method 1700) and unreserved items. Illustratively, method 1800 is an embodiment exemplifying the operation of the purchase program 962. Method 1800 is entered at step 1802 and proceeds to step 1805 to wait on an event. At step 1810 method 1800 retrieves an event for processing. Method 1800 continues immediately to step 1815 to query whether the event is to purchase an item. If not, processing proceeds to step 1820 to perform normal machine operations. Method 1800 then returns to step 1805 to wait on another event.

If, at step 1815, the event is a purchase event, then method 1800 proceeds to step 1825 to query whether the purchase event is a reserve purchase (i.e., a request to purchase an item previously reserved via method 1700). This may be determined, for example, according to a reservation code input by the customer (the code was provided to the customer at the time the reservation was made). If the purchase event is not for a reserved item, method 1800 proceeds to step 1830 where it is determined if a sufficient quantity of the item is available for purchase. Thus, step 1830 includes a reference to the entry 1106 of the product table 948 for the machine being interfaced with (as determined by the location ID). If the item (or the desired quantity) is not available, then at step 1835 a message is sent to the message area at 1690 stating that all remaining items (if any) are reserved and the product is not available to be purchased. If step 1830 is answered affirmatively, then method 1800 proceeds to step 1820 and a sale of the item is completed. Upon such a sale the method 1800 returns to step 1805 to wait on another event.

Referring back to step 1825, if the purchase is a reserve purchase, method 1800 proceeds to step 1838 and queries whether the item was reserved by the particular machine currently being interfaced with by the customer. This step is included because it is contemplated that a customer may attempt to retrieve an item from a location/machine that was not specifically designated in the reservation order. If step 1838 is answered negatively, the method 1800 queries whether the item/quantity is available at step 1839. If not, the appropriate message is output to the customer at step 1835 as described above. The method 1800 then returns to step 1805 to wait on another event. If either of step 1838 or step 1839 is answered affirmatively, the method 1800 proceeds to step 1840 where a cost is calculated and charged to the customer. The calculation at step 1840 includes a determination of whether any amount of the purchase price has been pre-paid (by accessing the pre-paid entry 1218), whether a non-refundable cost has been posted (by accessing the non-refundable cost data structure 955A), whether a penalty has accrued (by accessing the date/time entry 1212 to determine the expired time since the reservation was made and then accessing the non-refundable cost data structure 955B), etc. The resulting balance, if any, is then charged to the customer (e.g., money is accepted, the customer's credit card is charged, etc.).

Processing continues at step 1845 where the appropriate entry is removed from the reserved item table 950. According to the particular implementation, this step may be handled in a variety of different ways. For example, if the reserved item table 950 is locally resident on the particular vending machine being interfaced with, then the local copy of the reserved item table 950 is updated. If a remote copy of the reserved item table 950 exists (e.g., on the central control system 920) then an update message is transmitted from the local machine to the remote machine instructing the remote machine to update the reserved item table 950. In this manner, regardless of its location, the reserved item table 950 will be updated to reflect that the reserved item has been retrieved. The item is then dispensed at step 1850. Method 1800 then returns to step 1805 to wait on another event.

Figure 19:
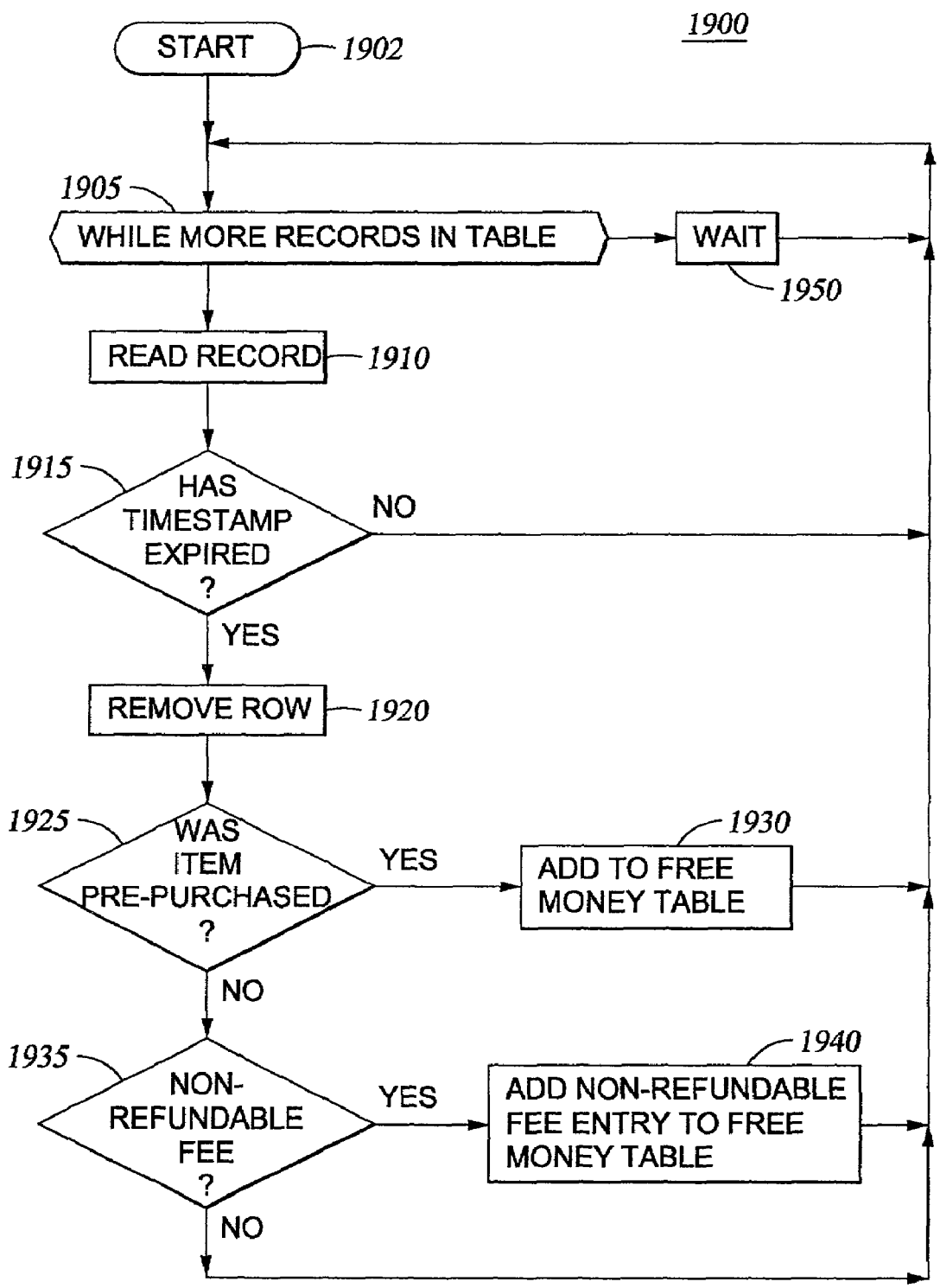
FIG. 19 is a flowchart illustrating a method for processing data structures containing reservation information in a vending machine environment.

FIG. 19 depicts a flow diagram of a method 1900 for cleaning up the reserve item table 950 and populating the free money table 954 with unhandled reserved item requests. Method 1900 may be understood as one embodiment exemplifying the operation of the batch reserve program 958.

Method 1900 is entered at step 1902 and then enters a loop at step 1905. The loop is performed for each record in the reserved item table 950. A record is read at step 1910 and at step 1915 it is determined if the time and date in the record (entry 1212) have passed. If not, then method 1900 returns to step 1905 to loop through the remaining records of the reserved item table 950. If, at step 1915, the time and date have passed then processing continues at step 1920 where the appropriate record is removed from the reserved item table 950. Method 1900 then proceeds to step 1925.

At step 1925, the method 1900 queries whether the item was pre-paid. If so, an entry is added to the free money table 954 indicating that the item was not picked up at step 1930 and the method 1900 returns to step 1905 to process the next record. If the item was not a pre-paid, then processing continues at step 1935 where it is determined whether there will be non-refundable charge with reference to the flag at entry 1214 of the current reserved item table record. If a non-refundable charge exists then, at step 1940, an entry is added to the free money table 954 reflecting the fact that a non-refundable charge was applied (e.g., against the consumer's credit card) in the amount specified by entry 1218 of the current reserved item table record. Method 1900 then returns to step 1905 to begin processing the next record. If, at step 1935, there is no non-refundable charge, method 1900 returns to step 1905. Once all records have been processed, then method 1900 proceeds to step 1950 where the program 958 waits by some pre-determined amount of time before processing the reserved item tables 950 again.

As described above with reference to FIG. 15B, a penalty may be charged to a customer in some cases. Thus, while not shown in FIG. 19, method 1900 may also include steps to post a penalty charge to a customer's account. This may occur, for example, when an upper time limit has expired. In such cases, it may be desirable to notify the customer of the charge. Accordingly, any variety of notification methods may be employed including, regular mail, electronic mail, wireless notification methods (e.g., wireless telephone and pager) and the like.

Refund Systems and Methods

In each of the foregoing embodiments the customer is typically expected to pay for the purchased item(s). For example, the customer may insert bills into the cash acceptor interface 114 (shown in FIG. 1). However, as described above, in some cases the transaction is corrupted, such that the customer is charged for an item he/she never receives or for defective goods or services. In such instances, embodiments for recovery of funds paid are provided.

FIG. 20 shows a refund processing machine 2000. In one embodiment, the refund processing machine 2000 is a vending machine illustrative of a machine such as the vending machines $104_1, 104_2, \ldots 104_N$ described above with reference to FIG. 1-2. In another embodiment, the machine 2000 is a refund processing computer remotely located from vending machines and accessible from a plurality of devices. For example, the refund processing machine 2000 may be implemented similarly to the central control system 920. For simplicity, the following discussion assumes that the machine 2000 is a vending machine. Further, the components of the machine 2000 may be similar to those described above with reference to FIG. 3. Accordingly, where possible, like numerals have been used to identify components previously discussed with reference to FIG. 3.

The CPU 302 of the vending machine 2000 is shown configured with a refund program 2002, which may be loaded from memory 304 for execution. The memory 304 contains data structures which may be utilized by the refund program 2002 during execution. Illustratively, the memory 304 contains a refund file 2004.

FIG. 21 shows one embodiment of illustrative refund file 2004. The refund file 2004 includes a record for each refund request processed by the vending machine 2000. Each record comprises a number of entries corresponding to column designations. Illustratively, each record includes a customer ID entry 2102, a payment form entry 2104, an item entry 2106, a quantity entry 2108, a date entry 2110, a total cost entry 2112, and a refund flag entry 2114. An entry 2116 is representative of other columns that may be included in other embodiments.

The customer ID entry 2102 may contain any value or values that identify a customer. For example, a Social Security number may be used. Alternatively, a customer name and address may be used. The payment form entry 2104 indicates the means by which a customer paid for a particular item. Payment forms include, for example, credit cards, debit cards, checks, cash etc. In the case of credit cards and debit cards the payment form entry 2104 may also include card information such as a card number and expiration date. The item (or service) which a customer purchased or attempted to purchase, and for which a refund is being requested, is indicated by item entry 2106. The quantity of items purchased is contained in the quantity entry 2108. The date of the purchase transaction is contained in the date entry 2110. The total cost of the transaction is contained in the total cost entry 2112. The refund flag entry 2114 indicates whether the customer was refunded for the transaction represented by the record.

Figure 22:
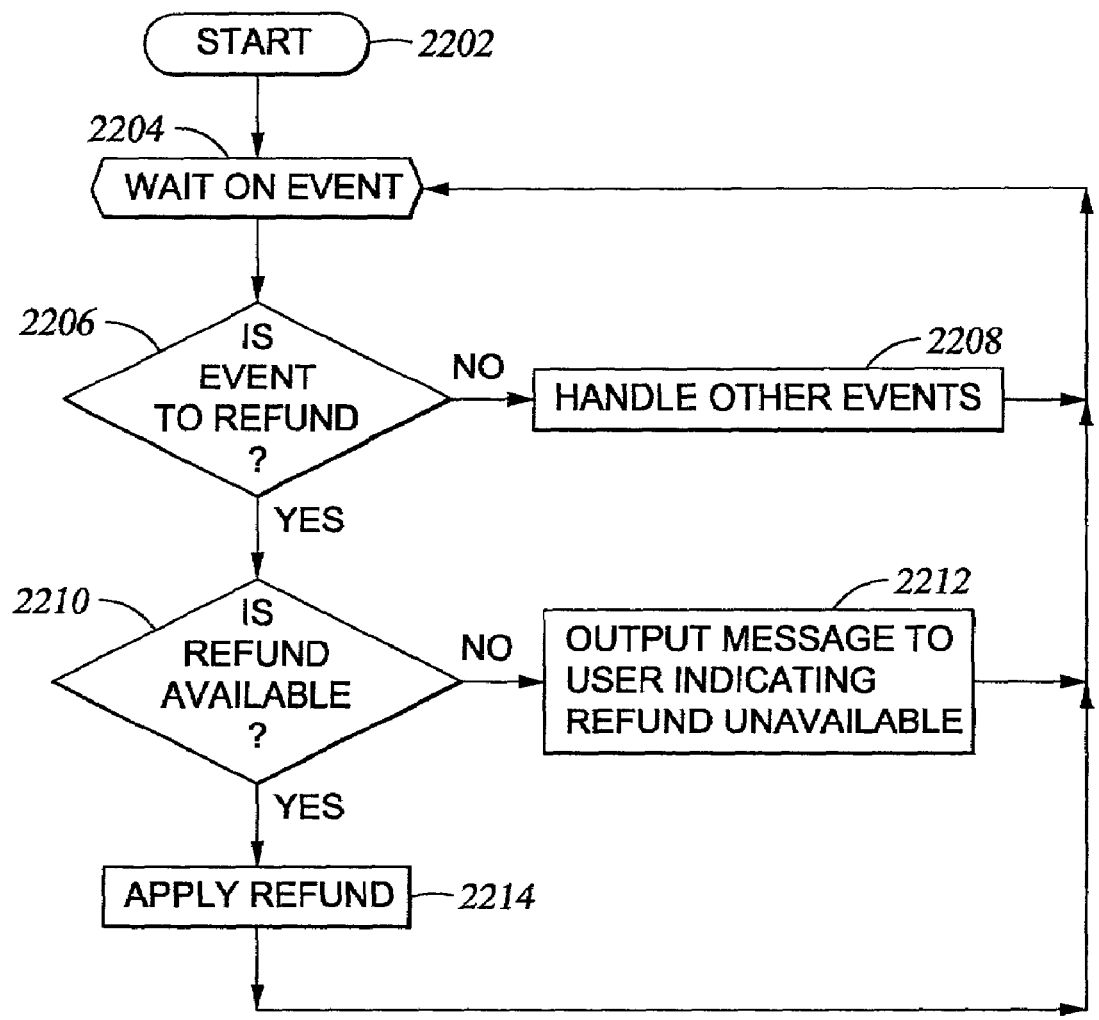
FIG. 22 is a flowchart illustrating a method for processing a refund request.

FIG. 22 shows a method 2200 for handling a refund request. The method 2200 may be understood as one embodiment illustrating the execution of the refund program 2002.

Method 2200 is entered at step 2202 and then proceeds to step 2204 to wait on an event. When an event is received, the method 2200 proceeds to step 2206 and queries whether the event is a refund request. A refund request may be initiated by a refund requestor (e.g., consumer) selecting a refund option provided on an output device (e.g., the display 108 shown in FIG. 1) following a purchase order. The purchase order may be for an item at the machine with which the customer is interfacing or an item at a remotely located machine on the network of machines. In some embodiments, the refund option may only be provided when the vending machine 2000 detects a corrupted transaction. For example, the vending machine 2000 may detect that the purchased item is lodged in the dispensation slot 112 (shown in FIG. 1) or that the customer's money is lodged in the coin acceptor. In another embodiment, the refund option is provided after every transaction. In still another embodiment, the customer may required to agree to a charge (in the amount of the requested refund) to a credit card (or similar instrument) if a subsequent investigation indicates that the refund was not merited. In this latter embodiment, the agreement of the customer to a possible charge may be attained via the input interface (e.g., the input interface 110 shown in FIG. 1) of the vending machine.

In yet another embodiment, only select customers are allowed refunds. For example, those customers who repeatedly purchase an item and have purchased a threshold number of items (i.e., loyal repeat customers) may receive refunds upon request. The historical purchase data of customers is maintained with reference to the customer ID described above. Thus, a record for each purchase by a given customer may exist. When a refund is requested, the database of records for the requesting customer is accessed to determine the customer's purchase history. Statistical algorithms may then be performed to determine the customer's eligibility for a refund. The refund approval may depend on such factors as the frequency with which the customer makes purchases for the item on which the refund is being requested, the total volume (in dollars) of sales to the customer at vending machines, the ratio of the refund to the sales, etc. In some cases, the customer's credit history may be checked to determine financial responsibility, in much the same way credit history analysis is performed by lending institutions and credit card issuers.

If the event is not a refund request, the event is handled at step 2208 and the method 2200 then returns to step 2204 to wait on another event. If the event is a refund request, the method 2200 proceeds from step 2206 to step 2210 and queries whether a refund is available. In one embodiment, the determination at step 2210 includes a reference to the refund file 2004 to determine whether the customer qualifies for a refund. For example, a determination may be made as to whether the customer requesting the refund has requested refunds in the past. If the customer has previously requested refunds, steps may be taken to restrict the number of refunds and/or the amount of money refunded in a given time period. In some embodiments, a customer who repeatedly requested refunds is prevented from making additional purchases at the vending machine 2000, or any other networked vending machine. Of course, this latter embodiment assumes payment forms (e.g., credit cards) which allow the vending machine 2000 to identify the customer before completing the purchase order. In another embodiment, a network of vending machines may collectively have an upper limit on refunds. When the limit is reached, no vending machine on the network will issue any more refunds. Alternatively or additionally, each vending machine 2000 may be configured with its own upper limit.

If a refund is not available at step 2210, the method 2200 proceeds to step 2212 where a message is issued to the customer indicating that a refund is not available. A reason for the refund unavailability may also be provided to the customer.

If a refund is available at step 2210, the method 2200 proceeds to step 2214 where the refund is applied. The manner in which the refund is applied may depend upon the payment forms selected by the customer. For example, in the case of a credit card purchase, the refund may be applied to the customer's credit card. In the case of a check purchase, the check is returned to the customer. The method 2200 then returns to step 2204 to wait on another event.

In another embodiment, instead of issuing a refund, the vending machine with which the customer is interfacing may attempt to locate the item for which the refund is requested at another vending machine. This attempt may be made automatically by the vending machine with which the customer is interfacing in response to the refund request or may be made at the option of the customer. Embodiments for locating a vending machine item have been described above. If the item can be located at another machine, the user is provided with the option to retrieve the item at the other machine. If more than one machine carries the item, the user may elect which machine to retrieve the item from. Retrieval of the item may be facilitated by issuing the customer a retrieval identification number which may be input to any networked vending machine carrying the item.

In some embodiments, the information made available by the refund file 2004 is used for maintenance purposes and failure analysis. For example, a vending machine at which numerous refunds are requested may be indicative of a defective machine. Accordingly, the machine may be evaluated and, if necessary, repaired before returning the machine to operation.

It should be noted that while the refund program 2002 and the inventory program 310 (and their associated data structures) are shown separately (in FIG. 20 and FIG. 3, respectively), in some embodiments a vending machine is configured with both programs 310, 2002 to support both their respective features. More generally, a network of vending machines may support any combination of the item location embodiments, the reservation embodiments, and the refund embodiments.

While the foregoing is directed to embodiments of the present invention, other and further embodiments of the invention may be devised without departing from the basic scope thereof, and the scope thereof is determined by the claims that follow.

What is claimed is:

1. A method of operating a reservation control system for reserving items dispensed by vending machines networked to the reservation control system, comprising:
   receiving, from a requesting computer, a reservation request for an item;
   determining whether the item is available at a vending machine;
   upon determining the item is available, reserving the item to ensure availability of the item at the vending machine in satisfaction of the reservation request, wherein reserving the item comprises placing a hold on the item at the vending machine to prevent the item from being purchased by any person other than a person for whom the reservation request is made; and
   receiving an authorized request at the vending machine to dispense the item reserved for the person for whom the reservation request was made; and
   in response to receiving the request to dispense the item, calculating a service charge for the item according to a length of time for which the item was reserved.

2. The method of claim 1, further comprising, if the item is available, transmitting a message indicating that the reservation request has been accepted, whereby the item is reserved for a future pickup.

3. The method of claim 1, wherein the reservation control system is a receiving vending machine.

4. The method of claim 1, wherein the requesting computer is a requesting vending machine.

5. The method of claim 1, wherein receiving a reservation request comprises receiving an item identifier and an item location identifier.

6. The method of claim 1, wherein the reservation request is received from a wireless telephone.

7. The method of claim 1, wherein the vending machine is connected to a network of vending machines.

8. The method of claim 1, wherein determining whether the item is available at the vending machine comprises accessing a product data structure containing a value indicative of a number of the item available at the vending machine, wherein the data structure is periodically updated with information received from the vending machine.

9. The method of claim 1, further comprising, upon determining that the item has been purchased from the vending machine, removing an associated reservation request record from a reservation data structure.

10. The method of claim 1, wherein reserving the item the item comprises assigning a confirmation number to the reservation request, wherein the confirmation number is used to retrieve the item from the vending machine at future time.

11. The method of claim 10, further comprising, if the item is available, transmitting to the requesting computer a message containing the confirmation number.

12. The method of claim 1, wherein reserving the item the item comprises storing an item identifier and a vending machine location identifier and assigning a confirmation number to the reservation request.

13. The method of claim 12, further comprising, if the item is available, transmitting a message containing the confirmation number.

14. The method of claim 1, further comprising receiving an electronic input indicative of a selection to retrieve the item at the vending machine.

15. The method of claim 1, further comprising:
charging the service charge to a purchaser of the item.

16. The method of claim 15, wherein the service charge increases with an increasing reservation time.

17. A reservation system for reserving items dispensed by vending machines, comprising:
a memory containing a reservation program;
a first network interface to support a first network connection with a client computer issuing a reservation request for a vending machine item;
a second network interface to support a second network connection with at least one vending machine; and
a processor which, when configured by the reservation program:
determines an availability of the vending machine item at the at least one vending machine;
upon determining the vending machine item is available, reserves the item to ensure availability of the item in satisfaction of the reservation request, wherein reserving the item comprises placing a hold on the item to prevent the item from being purchased by any person other than a person for whom the reservation request is made; and
upon receiving an authorized request at the vending machine to dispense the item reserved for the person for whom the reservation request was made, calculates a service charge for the item according to a length of time for which the item was reserved.

18. The reservation system of claim 17, wherein the first network interface and the second network interface are the same.

19. The reservation system of claim 17, wherein the processor is further configured to issue a confirmation number to the client computer if the item is available.

20. The reservation system of claim 17, wherein the processor determines the availability of the vending machine item by accessing a reservation data structure contained in the memory and wherein the reservation data structure is periodically updated with information received from the vending machine.

21. The reservation system of claim 17, wherein the reservation system is a vending machine.

22. A method of operating a reservation control system for reserving items dispensed by vending machines networked to the reservation control system, comprising:
receiving, from a requesting computer, a reservation request for an item;
determining whether the item is available at a vending machine;
upon determining the item is available at the first vending machine, reserving the item to ensure availability of the item in satisfaction of the reservation request, wherein reserving the item comprises placing a hold on the item to prevent the item from being purchased by any person other than a person for whom the reservation request is made;

receiving a request input to a second vending machine to dispense the item, wherein the second vending machine is different from the first vending machine; and
upon determining the item is available at the second vending machine:
calculating a service charge for the item according to a length of time for which the item was reserved;
charging the calculated service charge to a purchaser of the item; and
issuing an instruction to dispense the item from the second vending machine and updating a data structure to indicate that the item has been dispensed.

23. The method of claim 1 further comprising:
calculating a maximum hold duration for which the item will be reserved, and after which the reservation of the item expires; and
upon detecting expiration of the maximum hold duration, charging a penalty fee to the person for whom the reservation request was made if the item had not yet been retrieved when the maximum hold duration expires.

24. The method of claim 22, further comprising:
calculating a maximum hold duration for which the item will be reserved, and alter which the reservation of the item expires; and
upon detecting expiration of the maximum hold duration, charging a penalty fee to the person for whom the reservation request was made if the item had not yet been retrieved when the maximum hold duration expires.

25. A reservation system for reserving items dispensed by vending machines, comprising:
a memory containing a reservation program;
a first network interface to support a first network connection with a client computer issuing a reservation request for a vending machine item;
a second network interface to support a second network connection with at least one vending machine; and
a processor which, when configured by the reservation program performs processing, comprising:
upon receiving the reservation request, determining an availability of the vending machine item at the at least one vending machine;
upon determining the vending machine item is available, reserving the item to ensure availability of the item in satisfaction of the reservation request, wherein reserving the item comprises placing a hold on the item to prevent the item from being purchased by any person other than a person for whom the reservation request is made;
calculating a maximum hold duration for which the item, will be reserved, and after which the reservation of the item expires; and
upon detecting expiration of the maximum hold duration, charging a penalty fee to the person for whom the reservation request was made if the item had not yet been retrieved when the maximum hold duration expires.

26. The apparatus of claim 25, further comprising upon receiving an authorized request at the vending machine to dispense the item reserved for the person for whom the reservation request was made, calculating, by the processor, a service charge for the item according to a length of time for which the item was reserved.

* * * * *